US008291087B2

(12) United States Patent
Doi

(10) Patent No.: US 8,291,087 B2
(45) Date of Patent: Oct. 16, 2012

(54) INFORMATION PROCESSING APPARATUS AND METHOD TO FACILITATE ADMINISTRATION OF WEB E-MAIL

(75) Inventor: Masataka Doi, Suita (JP)

(73) Assignee: Canon Kabushiki Kaisha, Tokyo (JP)

( * ) Notice: Subject to any disclaimer, the term of this patent is extended or adjusted under 35 U.S.C. 154(b) by 468 days.

(21) Appl. No.: 12/143,094

(22) Filed: Jun. 20, 2008

(65) Prior Publication Data

US 2008/0256207 A1     Oct. 16, 2008

Related U.S. Application Data

(63) Continuation of application No. PCT/JP2007/075367, filed on Dec. 26, 2007.

(30) Foreign Application Priority Data

Dec. 28, 2006   (JP) .................................. 2006-356528

(51) Int. Cl.
     *G06F 15/16*       (2006.01)
(52) U.S. Cl. .......................... 709/227; 709/206; 709/224
(58) Field of Classification Search ........................ None
See application file for complete search history.

(56) References Cited

U.S. PATENT DOCUMENTS

| 5,835,724 | A  | * | 11/1998 | Smith ............................ 709/227 |
| 6,356,937 | B1 | * | 3/2002  | Montville et al. ............ 709/206 |
| 6,560,589 | B1 | * | 5/2003  | Stier et al. ...................... 706/50 |
| 6,760,751 | B1 |   | 7/2004  | Hachiya et al. ................ 709/206 |
| 6,898,597 | B1 | * | 5/2005  | Cook et al. ............................ 1/1 |
| 7,072,947 | B1 | * | 7/2006  | Knox et al. .................... 709/217 |
| 7,185,089 | B2 | * | 2/2007  | Satomi et al. ................. 709/224 |
| 7,337,370 | B2 | * | 2/2008  | Haynes et al. ................... 714/47 |
| 7,461,382 | B2 | * | 12/2008 | Hammerich et al. ......... 719/318 |
| 2002/0013854 | A1 | * | 1/2002 | Eggleston et al. ............ 709/234 |
| 2002/0019763 | A1 | * | 2/2002 | Linden et al. .................... 705/10 |
| 2002/0042823 | A1 | * | 4/2002 | DeBettencourt et al. ..... 709/224 |

(Continued)

FOREIGN PATENT DOCUMENTS

JP     2003-141070 A     5/2003

(Continued)

OTHER PUBLICATIONS

Tsunoru Nakajima, "Web no Log Kaiseki Tool," Nikkei Internet Technology, Aug. 1998, No. 14, pp. 122-129.

(Continued)

*Primary Examiner* — Ian N Moore
*Assistant Examiner* — Dung B Huynh
(74) *Attorney, Agent, or Firm* — Fitzpatrick, Cella, Harper & Scinto

(57) ABSTRACT

In a case where session management information is created from request information concerning a Web-based e-mail transmitted as HTTP data, if the request information coincides with a previously defined session start event for each Web-based e-mail service, a relay server adds a new entry to the session management information. On the other hand, if the request information coincides with a previously defined data operation event for each Web-based e-mail service, the relay server updates entry data of the session management information. Consequently, an administrator can execute higher accurate mail browsing by extracting, from the request information concerning the Web-based e-mail, not only the content of the Web-based e-mail but also a mail creation start method and a transmission state of the Web-based e-mail.

13 Claims, 17 Drawing Sheets

U.S. PATENT DOCUMENTS

| | | | |
|---|---|---|---|
| 2002/0073211 A1* | 6/2002 | Lin et al. | 709/229 |
| 2002/0076053 A1* | 6/2002 | Hachimura | 380/277 |
| 2002/0087679 A1* | 7/2002 | Pulley et al. | 709/224 |
| 2002/0169868 A1* | 11/2002 | Lopke et al. | 709/224 |
| 2003/0028515 A1 | 2/2003 | Nishikado et al. | 707/1 |
| 2003/0084165 A1* | 5/2003 | Kjellberg et al. | 709/227 |
| 2003/0187706 A1* | 10/2003 | Buchmiller et al. | 705/7 |
| 2004/0205572 A1* | 10/2004 | Fields et al. | 715/513 |
| 2004/0243577 A1* | 12/2004 | Choudhary et al. | 707/6 |
| 2004/0249900 A1* | 12/2004 | Karstens | 709/207 |
| 2005/0188318 A1* | 8/2005 | Tamir et al. | 715/744 |
| 2005/0198331 A1* | 9/2005 | Okajima et al. | 709/229 |
| 2006/0123346 A1* | 6/2006 | Totman et al. | 715/748 |
| 2006/0224674 A1* | 10/2006 | Buchheit et al. | 709/206 |
| 2006/0236236 A1* | 10/2006 | Wilbrink et al. | 715/530 |
| 2007/0150600 A1* | 6/2007 | Barsness et al. | 709/227 |

FOREIGN PATENT DOCUMENTS

| | | |
|---|---|---|
| JP | 2004-348202 | 12/2004 |
| JP | 2004-348202 A | 12/2004 |
| KR | 1998-0064436 | 10/1998 |
| KR | 2001-0045955 | 6/2001 |
| WO | WO 01/35237 | 5/2001 |

OTHER PUBLICATIONS

Office Action issued Jul. 6, 2011 in Korean counterpart application (English summary provided above).

* cited by examiner

FIG. 8

| SITE ID | SITE NAME | CLIENT IDENTIFIER | SESSION IDENTIFIER |
|---|---|---|---|
| 1 | freemail | Cookie PARAMETER 'SESSID' VALUE | FORM DATA 'mailid' VALUE |
| 2 | Cool MAIL | ... | ... |
| ... | ... | ... | ... |
| ... | ... | ... | ... |

FIG. 9

| SITE ID | EVENT | DEFINITION | ACTION |
|---|---|---|---|
| 1 | NEW CREATION | REQUEST URL COINCIDES WITH 'http://mail.example.com/Compose', AND QUERY PARAMETER DOES NOT INCLUDE 'msgid' VALUE | ·SET "NEW" TO START METHOD<br>·SET STATUS TO "START"<br>·SET START HOUR AND USER INFORMATION |
| | DRAFT OPEN | REQUEST URL COINCIDES WITH 'http://mail.example.com/Compose', AND QUERY PARAMETER INCLUDES 'msgid' VALUE, AND VALUE OF 'draft' IN QUERY PARAMETER IS "t" | ·SET "DRAFT" TO START METHOD<br>·SET STATUS TO "START"<br>·SET START HOUR AND USER INFORMATION |
| | RETURN | REQUEST URL COINCIDES WITH 'http://mail.example.com/Compose', AND QUERY PARAMETER INCLUDES 'msgid' VALUE, AND VALUE OF 'mode' IN QUERY PARAMETER IS "r" | ·SET "RETURN" TO START METHOD<br>·SET STATUS TO "START"<br>·SET START HOUR AND USER INFORMATION |
| | RETURN TO ALL | REQUEST URL COINCIDES WITH 'http://mail.example.com/Compose', AND QUERY PARAMETER INCLUDES 'msgid' VALUE, AND VALUE OF 'mode' IN QUERY PARAMETER IS "ra" | ·SET "RETURN TO ALL" TO START METHOD<br>·SET STATUS TO "START"<br>·SET START HOUR AND USER INFORMATION |
| | TRANSFER | REQUEST URL COINCIDES WITH 'http://mail.example.com/Compose', AND INCLUDES 'msgid' VALUE IN QUERY PARAMETER, AND VALUE OF 'mode' IN QUERY PARAMETER IS "fwd" | ·SET "TRANSFER" TO START METHOD<br>·SET STATUS TO "START"<br>·SET START HOUR AND USER INFORMATION |
| | ⋮ | ⋮ | ⋮ |
| 2 | | | |
| ⋮ | | | |

FIG. 10

| SITE ID | EVENT | DEFINITION | ACTION |
|---|---|---|---|
| 1 | FILE ATTACHMENT | REQUEST URL COINCIDES WITH 'http://mail.example.com/Attach', AND VALUE OF FORM DATA 'action' COINCIDES WITH 'attach' | •ADD DATA OF FORM DATA 'userFile' TO ATTACHED FILE<br>•UPDATE FINAL HOUR |
| | DELETION OF ATTACHED FILE | REQUEST URL COINCIDES WITH 'http://mail.example.com/Attach', AND VALUE OF FORM DATA 'del' COINCIDES WITH REGULAR EXPRESSION 'file[1-9]' | •IF VALUE OF FORM DATA 'del' IS 'file<i>' DELETE ATTACHED FILE TRANSMITTED <i>TH<br>•UPDATE FINAL HOUR |
| | TRANSITION TO FILE ATTACHMENT SCREEN | REQUEST URL COINCIDES WITH 'http://mail.example.com/Compose', AND VALUE OF FORM DATA 'action' COINCIDES WITH 'attach' | •SET VALUE OF FORM DATA 'To' TO DESTINATION<br>•SET VALUE OF FORM DATA 'CC' TO Cc<br>•SET VALUE OF FORM DATA 'Subj' TO SUBJECT<br>•SET VALUE OF FORM DATA 'Body' TO BODY TEXT<br>•SET STATE TO "IN CREATION"  •UPDATE FINAL HOUR |
| | MAIL TRANSMISSION | REQUEST URL COINCIDES WITH 'http://mail.example.com/Compose', AND VALUE OF FORM DATA 'action' COINCIDES WITH 'send' | •SET VALUE OF FORM DATA 'To' TO DESTINATION<br>•SET VALUE OF FORM DATA 'CC' TO Cc<br>•SET VALUE OF FORM DATA 'Subj' TO SUBJECT<br>•SET VALUE OF FORM DATA 'Body' TO BODY TEXT<br>•SET STATE TO "TRANSMITTED"  •UPDATE FINAL HOUR |
| | DRAFT STORAGE | REQUEST URL COINCIDES WITH 'http://mail.example.com/Compose', AND VALUE OF FORM DATA 'action' COINCIDES WITH 'saved' | •SET VALUE OF FORM DATA 'To' TO DESTINATION<br>•SET VALUE OF FORM DATA 'CC' TO Cc<br>•SET VALUE OF FORM DATA 'Subj' TO SUBJECT<br>•SET VALUE OF FORM DATA 'Body' TO BODY TEXT<br>•SET STATE TO "DRAFT STORAGE"  •UPDATE FINAL HOUR |
| | CANCEL | REQUEST URL COINCIDES WITH 'http://mail.example.com/Compose', AND VALUE OF FORM DATA 'action' COINCIDES WITH 'cancel' | •SET VALUE OF FORM DATA 'To' TO DESTINATION<br>•SET VALUE OF FORM DATA 'CC' TO Cc<br>•SET VALUE OF FORM DATA 'Subj' TO SUBJECT<br>•SET VALUE OF FORM DATA 'Body' TO BODY TEXT<br>•SET STATE TO "CANCEL"  •UPDATE FINAL HOUR |
| 2 | ... | ... | ... |
| ... | | | |

FIG. 11

| SITE ID | CLIENT IDENTIFIER | SESSION IDENTIFIER | START METHOD | STATE | INPUT CONTENTS | | | | | |
|---|---|---|---|---|---|---|---|---|---|---|
| | | | | | DESTI-NATION | CC | BCC | SUBJECT | BODY TEXT | ATTACHED FILE |
| 1 | SESSID=9259721 | mailid=97h1jd82 | NEW | TRANSMITTED | ... | ... | ... | ... | ... | ... |
| 7 | sid=009_002 | a=a23401b1 | RETURN | DRAFT STORAGE | ... | ... | ... | ... | ... | ... |
| 3 | uid=123.551.956 | msg=ab43-981f | NEW | IN CREATION | ... | ... | ... | ... | ... | ... |
| 7 | sid=a17_001 | a=fd319189 | DRAFT | TRANSMITTED | ... | ... | ... | ... | ... | ... |
| 8 | pid=ajk2ikkj | | TRANSFER | START | ... | ... | ... | ... | ... | ... |
| ... | ... | ... | ... | ... | ... | ... | ... | ... | ... | ... |

| START HOUR | LAST HOUR | USER INFORMATION | |
|---|---|---|---|
| | | IP ADDRESS | AUTHENTICATION NAME |
| 2006/09/26/12:43:24 | 2006/09/26/13:00:00 | 192.168.0.1 | abc |
| 2006/09/26/14:23:25 | 2006/09/26/14:30:00 | 192.168.0.101 | xyz |
| ... | ... | ... | ... |
| 2006/09/26/19:05:02 | 2006/09/26/19:24:21 | 192.168.0.101 | xyz |
| ... | ... | ... | ... |

FIG. 12

| SITE ID | CLIENT IDENTIFIER | SESSION IDENTIFIER | START METHOD | STATE | INPUT CONTENTS | START HOUR | LAST HOUR | USER INFORMATION | | EVENT HISTORY |
|---|---|---|---|---|---|---|---|---|---|---|
| | | | | | | | | IP ADDRESS | AUTHENTICATION NAME | |
| 8 | pid=ajk2jkkj | | TRANSFER | START | | 2006/09/26 12:43:24 | | 192.168.0.1 | abc | TRANSFER (00075A-A0) |

FIG. 13

| SITE ID | CLIENT IDENTIFIER | SESSION IDENTIFIER | START METHOD | STATE | INPUT CONTENTS | START HOUR | LAST HOUR | USER INFORMATION | | EVENT HISTORY |
|---|---|---|---|---|---|---|---|---|---|---|
| | | | | | | | | IP ADDRESS | AUTHENTICATION NAME | |
| 8 | pid=ajk2jkkj | | TRANSFER | START | | 2006/09/26 12:43:24 | | 192.168.0.1 | abc | TRANSFER (00075A-A0) |
| 8 | pid=ajk2jkkj | | NEW | START | | 2006/09/26 12:44:12 | | 192.168.0.1 | abc | TRANSFER (000792-A0) |

FIG. 14

| SITE ID | CLIENT IDENTIFIER | SESSION IDENTIFIER | START METHOD | STATE | INPUT CONTENTS | START HOUR | LAST HOUR | USER INFORMATION | | EVENT HISTORY |
|---|---|---|---|---|---|---|---|---|---|---|
| | | | | | | | | IP ADDRESS | AUTHENTICATION NAME | |
| 8 | pid=ajk2|kkj | | TRANSFER or NEW | START | | 2006/09/26 12:43:24 or 2006/09/26 12:44:12 | | 192.168.0.1 | abc | TRANSFER (00075A-A0) or TRANSFER (000792-A0) |
| 8 | pid=ajk2|kkj | | TRANSFER or NEW | START | | 2006/09/26 12:43:24 or 2006/09/26 12:44:12 | | 192.168.0.1 | abc | TRANSFER (00075A-A0) or TRANSFER (000792-A0) |

| DATE HOUR | IP ADDRESS AUTHENTICATION NAME | SUBJECT MATTER | ATTACH-MENT | START METHOD | STATE | OPERATION |
|---|---|---|---|---|---|---|
| 2006/09/26 13:00:00 | 192.168.0.1 abc | ABOUT ○○ | YES | NEW | TRANSMITTED | BODY TEXT DISPLAY |
| 2006/09/26 14:30:00 | 192.168.0.101 xyz | Re: △△ | NONE | RETURN | DRAFT STORAGE | BODY TEXT DISPLAY ASSOCIATED MAIL SEARCH |
| ⋮ | ⋮ | ⋮ | ⋮ | ⋮ | ⋮ | ⋮ |
| 2006/09/26 19:24:21 | 192.168.0.101 xyz | Re: △△ | YES | DRAFT | TRANSMITTED | BODY TEXT DISPLAY ASSOCIATED MAIL SEARCH |
| ⋮ | ⋮ | ⋮ | ⋮ | ⋮ | ⋮ | ⋮ |

| DATE HOUR | IP ADDRESS AUTHENTICATION NAME | SUBJECT MATTER | ATTACH-MENT | START METHOD | STATE | OPERATION |
|---|---|---|---|---|---|---|
| ⋮ | ⋮ | ⋮ | ⋮ | ⋮ | ⋮ | BODY TEXT DISPLAY ASSOCIATED MAIL SEARCH |
| 2006/09/26 14:30:00 | 192.168.0.101 xyz | Re: △△ | NONE | RETURN | DRAFT STORAGE | BODY TEXT DISPLAY ASSOCIATED MAIL SEARCH |
| ⋮ | ⋮ | ⋮ | ⋮ | ⋮ | DRAFT STORAGE | BODY TEXT DISPLAY ASSOCIATED MAIL SEARCH |

| DATE HOUR | IP ADDRESS AUTHENTICATION NAME | SUBJECT MATTER | ATTACH-MENT | START METHOD | STATE | OPERATION |
|---|---|---|---|---|---|---|
| ⋮ | ⋮ | ⋮ | ⋮ | DRAFT | ⋮ | BODY TEXT DISPLAY ASSOCIATED MAIL SEARCH |
| 2006/09/26 19:24:21 | 192.168.0.101 xyz | Re: △△ | YES | DRAFT | TRANSMITTED | BODY TEXT DISPLAY ASSOCIATED MAIL SEARCH |
| ⋮ | ⋮ | ⋮ | ⋮ | DRAFT | ⋮ | BODY TEXT DISPLAY ASSOCIATED MAIL SEARCH |

FIG. 18

| DATE HOUR | EVENT | OPERATION |
|---|---|---|
| 2006/09/26 14:21:56 | NEW CREATION | DETAILED DISPLAY |
| ... | TRANSITION TO FILE ATTACHMENT SCREEN | DETAILED DISPLAY |
| ... | FILE ATTACHMENT | DETAILED DISPLAY |
| ... | DELETION OF ATTACHED FILE | DETAILED DISPLAY |
| ... | FILE ATTACHMENT | DETAILED DISPLAY |
| 2006/09/26 14:29:17 | MAIL TRANSMISSION | DETAILED DISPLAY |

FIG. 19

| | | |
|---|---|---|
| 1901 — PERIOD | NOVEMBER 2006 ▽  00 HOURS ▽  01 DAY (WED) ▽ ~ NOVEMBER 2006 ▽  30 DAY (THU) ▽ | |
| 1902 — TIME RANGE | 00 MINUTES ▽ ~ 24 HOURS ▽ 00 MINUTES ▽ | |
| 1903 — IP ADDRESS/AUTHENTICA-TION NAME | | |
| 1904 — SITE | ▽ | |
| 1905 — RECEIVER/BROADCAST RECEIVER ADDRESS | | |
| 1906 — MAIL SUBJECT | | |
| 1907 — ATTACHMENT | YES ▽ | |
| 1908 — TIME RANGE | OR MORE ▽ | |
| 1909 — START METHOD | ▽ | |
| 1910 — STATE | TRANSMITTED ▽ | |

1911 — [ DISPLAY ]  [ CLEAR ]

STORAGE MEDIUM SUCH AS FD, CD-ROM, ETC.

| DIRECTORY INFORMATION |
|---|
| 1ST DATA PROCESSING PROGRAM<br>PROGRAM CODE GROUP CORRESPONDING TO STEPS OF FLOW CHART ILLUSTRATED IN FIG. 3 |
| 2ND DATA PROCESSING PROGRAM<br>PROGRAM CODE GROUP CORRESPONDING TO STEPS OF FLOW CHART ILLUSTRATED IN FIG. 4 |
| 3RD DATA PROCESSING PROGRAM<br>PROGRAM CODE GROUP CORRESPONDING TO STEPS OF FLOW CHART ILLUSTRATED IN FIG. 5 |
| 4TH DATA PROCESSING PROGRAM<br>PROGRAM CODE GROUP CORRESPONDING TO STEPS OF FLOW CHART ILLUSTRATED IN FIG. 6 |
| |

MEMORY MAP OF STORAGE MEDIUM

INFORMATION PROCESSING APPARATUS AND METHOD TO FACILITATE ADMINISTRATION OF WEB E-MAIL

CROSS-REFERENCE TO RELATED APPLICATIONS

This application is a continuation of International Application No. PCT/JP2007/075367, filed Dec. 26, 2007, which claims the benefit of Japanese Patent Application No. 2006-356528, filed Dec. 28, 2006.

BACKGROUND OF THE INVENTION

1. Field of the Invention

The present invention relates to a technique for extracting and browsing an electronic mail created and transmitted by using the HTTP (HyperText Transport Protocol) passing through a data relay apparatus such as a proxy server or the like.

2. Description of the Related Art

It becomes possible to exchange, extremely simply and effectively, various information, according to development of network techniques. For example, it is possible to attach a material to be used in a conference to an electronic mail and then deliver the relevant electronic mail to the attendees before the relevant conference is held, without spending time and effort.

However, although the information can be easily exchanged according to the development of the network technique, the risk that important confidential information easily leaks out increases.

In addition to such a premise, a company is required to deal properly with information according to the enforcement of any applicable personal information protection law or the like. Consequently, for example, as a countermeasure for leakage of information, a system of checking the contents (text information such as the destination, the body text and the like, the content of an attached file, etc.) of an electronic mail transmitted from the inside to the outside, and of inhibiting transmission of the relevant electronic mail if the contents thereof coincide with a predetermined condition is introduced into many companies.

Further, the system like this is often a system which stores the transmission data to be transmitted to the outside so that an administrator can browse and check the contents thereof. Consequently, it is possible to reduce the risk that important confidential information leaks out from the inside of a company or that information being adverse to a company flows out.

Furthermore, if some problem occurs, it is possible to check which data flowed to where in which route, by analyzing the stored transmission data.

On the other hand, the risk of information leakage or outflow of adverse information through a network depends not only on transmission of electronic mails but also on another factor. That is, there is the same risk even in a Web service which uses the HTTP (HyperText Transport Protocol). For example, leakage of confidential information, outflow of adverse information or the like may also occur due to posting of messages to a BB (Bulletin Board) on the Internet. Since the Web services on the Internet which use the HTTP are diversified, companies are required to cope with leakage of information for each service.

As a representative example of the Web services, there is a service for transmitting and receiving an electronic mail by using the HTTP. In this service, it is possible to transmit and receive the electronic mail by using general-purpose browser software, that is, without using an electronic mail application. In the following, the electronic mail which is transmitted and received by using the HTTP is called a Web-based e-mail (for example, see Japanese Patent Application Laid-Open No. 2004-348202).

Since the protocol for mail transmission control and browsing of a Web-based e-mail like this is different from that of a conventional electronic mail (based on the SMTP (Simple Mail Transfer Protocol)), it is impossible to use the relay control method and the browsing method for the conventional electronic mail. Further, by using the technique disclosed in Japanese Patent Application Laid-Open No. 2004-348202, it is possible to execute communication control and browsing by using a specific keyword. However, in such a case, unlike the conventional electronic mail communication control and browsing system, it is impossible to execute minute communication control based on the information such as destination, CC (carbon copy), subject matter and the like, and it is also impossible for an administrator to browse the electronic mail.

Further, if it is intended to execute the communication control and/or the browsing as described above, it is impossible to do so only by considering differences among protocols, because there is no unified protocol for the conventional electronic mail. Furthermore, since the Web-based e-mail is essentially different from ordinary electronic mail in the point that the Web-based e-mail is constituted by plural HTTP transactions, there is a problem that an administrator has to correlate one piece of information with another when he/she intends to browse the Web-based e-mail.

In addition, the electronic mail is generally created by plural steps of storing a draft, adding an attached file, deleting the attached file, and the like. Thus, it is required to select, from several levels, the level that the administrator intends to browse. More specifically, it is required to select whether to browse only the finally transmitted electronic mail or to browse all the communication data including the data at the draft storing level, the data at the attached file adding and deleting level, and the data at the final transmitting (to a server) level. However, such a technique is not disclosed in Japanese Patent Application Laid-Open No. 2004-348202.

In a case where a conventional electronic mail is created, the process for handling the data of this mail until it is transmitted is closed in an electronic mail application on a client terminal apparatus. On the other hand, in a case where a Web-based e-mail is created, communication based on the HTTP starts in response to an electronic mail creation start operation.

For this reason, to enable the administrator to check to where which data flowed by which route, it is important to acquire, as well as the electronic mail data, the information of the mail creation start method as auxiliary information. However, the conventional technique could not cope with such a need.

SUMMARY OF THE INVENTION

The present invention has been completed in order to solve the above-described problems. Thus, the present invention aims to provide a mechanism to enable browsing of an electronic mail which can be more easily understood by an administrator, by extracting, from request information concerning a Web-based e-mail transmitted as HTTP data, not only the content of the electronic mail but also the electronic mail data including a data creation start method and a transmission state.

One of information processing apparatuses according to the present invention is, for example, an apparatus which relays data communication between an HTTP server which provides a website for providing a service to transmit and receive an electronic mail by using an HTTP and a client apparatus which can execute operations on the website by accessing the HTTP server, and which comprises: a session start even definition information storage unit for storing information to define a session start event and an action for each Web-based e-mail service; a data operation event definition information storage unit for storing information to define a data operation event and an action for each Web-based e-mail service; and a session management information creation unit for creating session management information from request information concerning a Web-based e-mail transmitted as HTTP data, wherein the session management information creation unit can add a new entry to the session management information in a case where the request information coincides with the session start event, and can update entry data of the session management information in a case where the request information coincides with the data operation event.

Consequently, according to the present invention, an administrator can execute higher accurate mail browsing by extracting, from the request information concerning the Web-based e-mail transmitted as the HTTP data, not only the content of the Web-based e-mail but also a mail creation start method and a transmission state of the Web-based e-mail.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the invention and, together with the description, serve to explain the principles of the invention.

FIG. 8 is a diagram indicating an example of a site definition table to be used in one embodiment of the present invention.

FIG. 9 is a diagram indicating an example of a session start event definition table to be used in one embodiment of the present invention.

FIG. 10 is a diagram indicating an example of a data operation event definition table to be used in one embodiment of the present invention.

FIG. 11 is a diagram indicating an example of a session management table to be used in one embodiment of the present invention.

FIG. 12 is a diagram indicating an example of the session management table to be used in one embodiment of the present invention.

FIG. 13 is a diagram indicating an example of the session management table to be used in one embodiment of the present invention.

FIG. 14 is a diagram indicating an example of the session management table to be used in one embodiment of the present invention.

FIG. 15 is a diagram indicating an example of a Web-based e-mail browsing screen to be displayed on an administrator terminal apparatus 107.

FIG. 16 is a diagram indicating an example of the Web-based e-mail browsing screen to be displayed on the administrator terminal apparatus 107.

FIG. 17 is a diagram indicating an example of the Web-based e-mail browsing screen to be displayed on the administrator terminal apparatus 107.

FIG. 18 is a diagram indicating an example of the Web-based e-mail browsing screen to be displayed on the administrator terminal apparatus 107.

FIG. 19 is a diagram indicating an example of an extraction condition input screen through which extraction conditions are input by the administrator terminal apparatus 107.

FIG. 20 is a diagram for describing a memory map of a recording medium (storage medium) which stores therein various data processing programs capable of being read (read out) by the information processing apparatus (relay server 101) according to one embodiment of the present invention.

DESCRIPTION OF THE EMBODIMENTS

The preferred embodiments of the present invention will now be described in detail with reference to the accompanying drawings.

Figure 1:
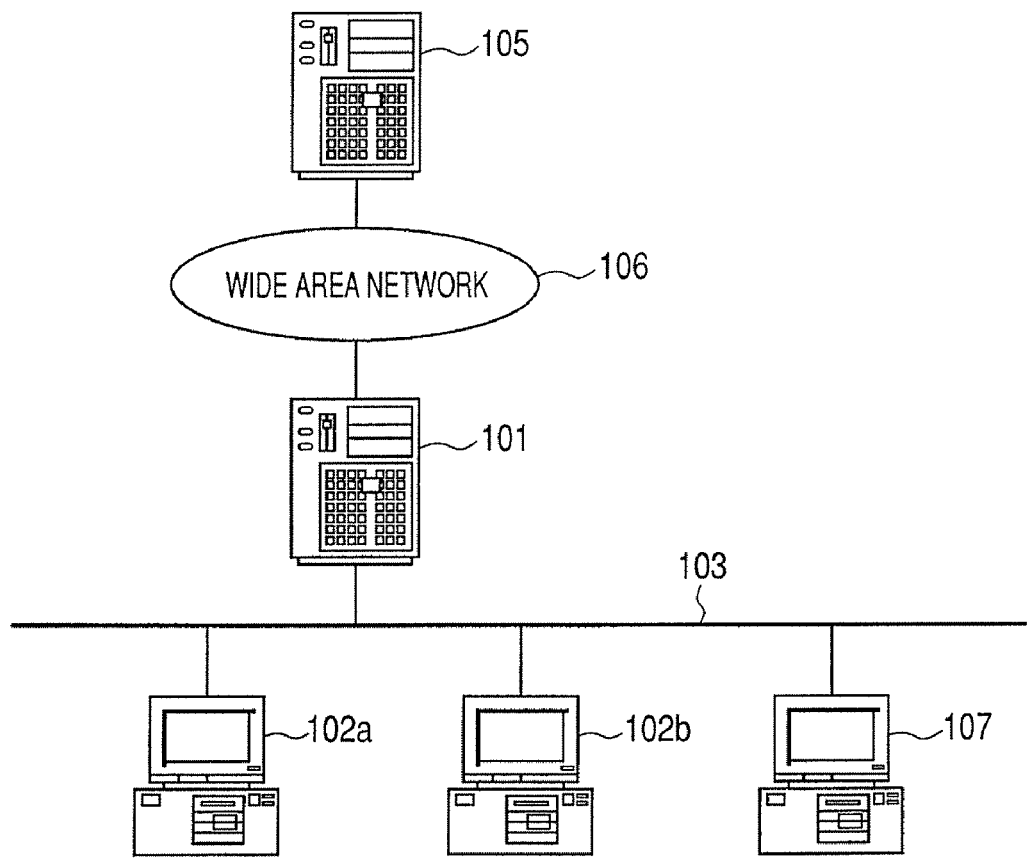
FIG. 1 is a diagram illustrating an example of a constitution of a system to which an information processing apparatus according to a preferred embodiment of the present invention is applicable.

FIG. 1 is a diagram illustrating an example of a constitution of a system to which an information processing apparatus according to one embodiment of the present invention is applicable.

As illustrated in FIG. 1, the system according to the embodiment of the present invention includes an HTTP server 105, client terminal apparatuses 102a and 102b, an administrator terminal apparatus 107, and a relay server 101 which functions as the information processing apparatus according to the embodiment of the present invention. Hereinafter, these units which together constitute the system according to this embodiment of the present invention will be described.

Each of the client terminal apparatuses 102a and 102b is used to access the HTTP server 105 through the relay server 101 and a wide area network 106 and thus browse a desired website (homepage) from among various websites provided by the HTTP server 105.

The administrator terminal apparatus 107 operates the control to be executed by the relay server 101 and executes various settings, by accessing the relay server 101. Further, the administrator terminal apparatus 107 executes settings and produces instructions to enable an administrator to browse electronic mail data from request records transmitted from the client terminal apparatuses 102a and 102b and stored in the relay server 101.

The HTTP server 105 functions as well as an HTTP server which is provided in a general provider. More specifically, the HTTP server 105 provides requested websites respectively to the client terminal apparatuses 102a and 102b which accessed through the relay server 101 and the wide area network 106.

In the present embodiment, it is assumed that, as one of the websites as described above, a website which provides a Web-based e-mail service is provided. As is well known, since a Web-based e-mail page is provided by the general provider, the detailed description thereof will be omitted.

The relay server 101 is used to relay data communication between each of the client terminal apparatuses 102a and 102b and the HTTP server 105. More specifically, if each of the client terminal apparatuses 102a and 102b accesses the Web-based e-mail page provided by the HTTP server 105, the relay server 101 creates and stores request records according to a predetermined format for all the requests.

Further, if the administrator terminal apparatus 107 inputs to the relay server 101 an operation instruction for extracting and displaying the electronic mail data from the request records stored in the relay server 101, the relay server 101 executes various processes according to the received operation instructions.

Incidentally, the processes to be executed by the relay server 101 will later be described in detail.

The wide area network 106 is a network such as the Internet. Here, it should be noted that a network 103 is constituted by the network such as the Internet or the like.

Figure 2:
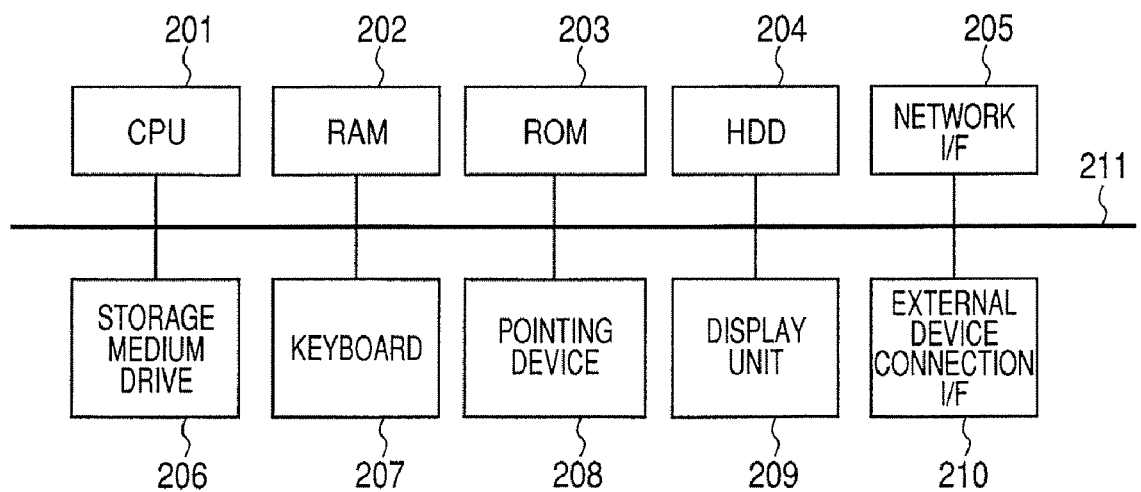
FIG. 2 is a block diagram illustrating a hardware constitution of a relay server 101 illustrated in FIG. 1.

FIG. 2 is a block diagram illustrating the hardware constitution of the relay server 101 illustrated in FIG. 1.

In FIG. 2, a CPU 201 controls the whole of the relay server 101 by using programs and data stored in a RAM 202 and/or a ROM 203, and also executes later-described various processes of the relay server 101.

The RAM 202 can properly provide various areas such as an area to be used to temporarily store programs and data loaded from an HDD (hard disk drive) 204 and a storage medium drive 206, programs and data externally received through a network I/F (interface) 205, and the like, a working area to be used by the CPU 201 to execute various processes, and the like.

The ROM 203 stores therein setting data of the relay server 101, boot programs, and the like.

The HDD 204 stores therein the programs and the data for causing the CPU 201 to execute the later-described various processes of the relay server 101. Under the control of the CPU 201, the programs and the data are properly loaded to the RAM 202 and then processed by the CPU 201.

The network I/F 205 is used to connect the relay server 101 to the network 103 and to the wide area network 106. Consequently, the relay server 101 can execute data communication to various devices which are connected to the network 103 and to the wide area network 106, through the network I/F 205.

The storage medium drive 206 reads programs and data recorded on storage media such as a CD-ROM, a CD-R/RW, a DVD-ROM, a DVD-R/RW, a DVD-RAM and the like, and outputs them to the RAM 202 and the HDD 204. Here, a part of the information stored in the HDD 204 may be stored on one or more of these storage media.

If an operator of the relay server 101 operates or handles a keyboard 207 and/or a pointing device 208 such as a mouse, a joy stick or the like, he/she can input various instructions to the CPU 201.

A display unit 209 such as a CRT, a liquid crystal screen or the like can display the processed results of the CPU 201, by using images, characters and the like.

An external device connection I/F 210 is a port for connecting a peripheral device to the relay server 101. Consequently, the relay server 101 transmits and receives data to and from the peripheral device through the external device connection I/F 210. The external device connection I/F 210, which consists of a USB (Universal Serial Bus), an IEEE (Institute of Electrical and Electronics Engineers) 1394 bus and the like, generally includes plural external device I/Fs. As for a method of connecting the relay server and the peripheral device, both a wired connection method and a wireless connection method are applicable.

A bus 211 is used to connect the above-described units mutually.

Incidentally, it should be noted that the hardware constitution of the relay server 101 is not limited to that illustrated in FIG. 2. Namely, the constitution of the relay server 101 may be properly modified if it is possible to execute the following process which will be described as the process to be executed by the relay server 101.

Further, the hardware constitutions of the client terminal apparatuses 102a and 102b, the administrator terminal apparatus 107 and the HTTP server 105 are generally the same as that illustrated in FIG. 2 as well known because general-purpose computers are used as these function elements.

Subsequently, the process to be executed by the relay server 101 in a case where each of the client terminal apparatuses 102a and 102b accesses the Web-based e-mail page provided by the HTTP server 105 through the wide area network 106 will be described with reference to FIG. 3.

Figure 3:
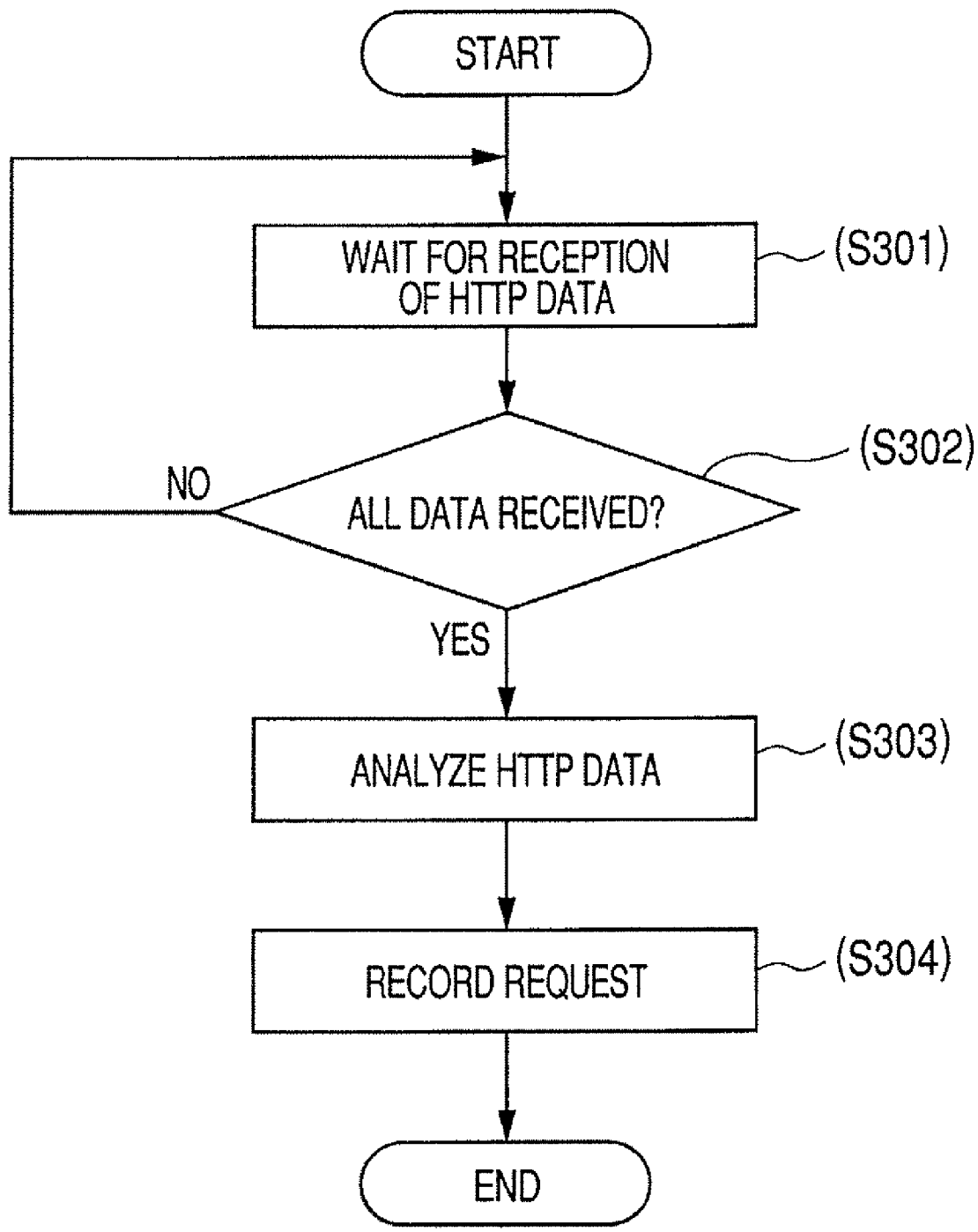
FIG. 3 is a flow chart indicating an example of a procedure of a first control process according to one embodiment of the present invention.

FIG. 3 is a flow chart indicating an example of a procedure of a first control process according to the present invention. Here, it should be noted that that the first control process corresponds to the process executed by the relay server 101.

Incidentally, the program and the data for causing the CPU 201 to execute the process according to the flow chart of FIG. 3 have been stored in the HDD 204. Consequently, if the program and the data stored in the HDD 204 are loaded to the RAM 202 under the control of the CPU 201, the CPU 201 executes the process by using the program and the data loaded to the RAM 202, and as a result the relay server 101 executes the following process. Here, it should be noted that S301, S302, S303 and S304 in FIG. 3 indicate respective steps.

In the following description, the client terminal apparatuses 102a and 102b are called as a client terminal apparatus 102 for the sake of simplicity.

As described above, the client terminal apparatus 102 is accessing the Web-based e-mail page at the point that the process according to the flow chart of FIG. 3 starts. At that time, the client terminal apparatus 102 is in the state capable of instructing to create, store and transmit an electronic mail.

For example, the Web-based e-mail page screen is displayed on the screen of the display unit of the client terminal apparatus 102, and an area for designating transmission destinations (TO, CC, BCC) of an electronic mail, an area to be used for describing the body text of an electronic mail, button images for storing and transmitting a created electronic mail to the HTTP server 105, a button image for designating a file to be attached to an electronic mail, and the like are provided in the Web-based e-mail page.

The CPU 201 of the relay server 101 is on standby to be able to receive any instruction transmitted from the client terminal apparatus 102 (S301).

Then, it is assumed that a user of the client terminal apparatus 102 inputs instructions for creating, storing and transmitting the electronic mail. For example, if the button image for instructing to create and store the electronic mail is operate on the side of the client terminal apparatus 102, an HTTP relay packet (HTTP data) including the instructed content is transmitted from the client terminal apparatus 102 to the relay server 101.

Then, if it is detected that the HTTP data is received through the network I/F 205, the CPU 201 of the relay server 101 stores the received data in the RAM 202 or the HDD 204. The process of storing the received data is executed until all the transmitted HTTP data are received (S302).

If all the HTTP data (that is, all the HTTP data transmitted from the client terminal apparatus 102 if one instruction concerning the electronic mail is input on the side of the client terminal apparatus 102) are received, the CPU 201 of the relay server 101 advances the process from step S302 to step S303.

Figure 7:
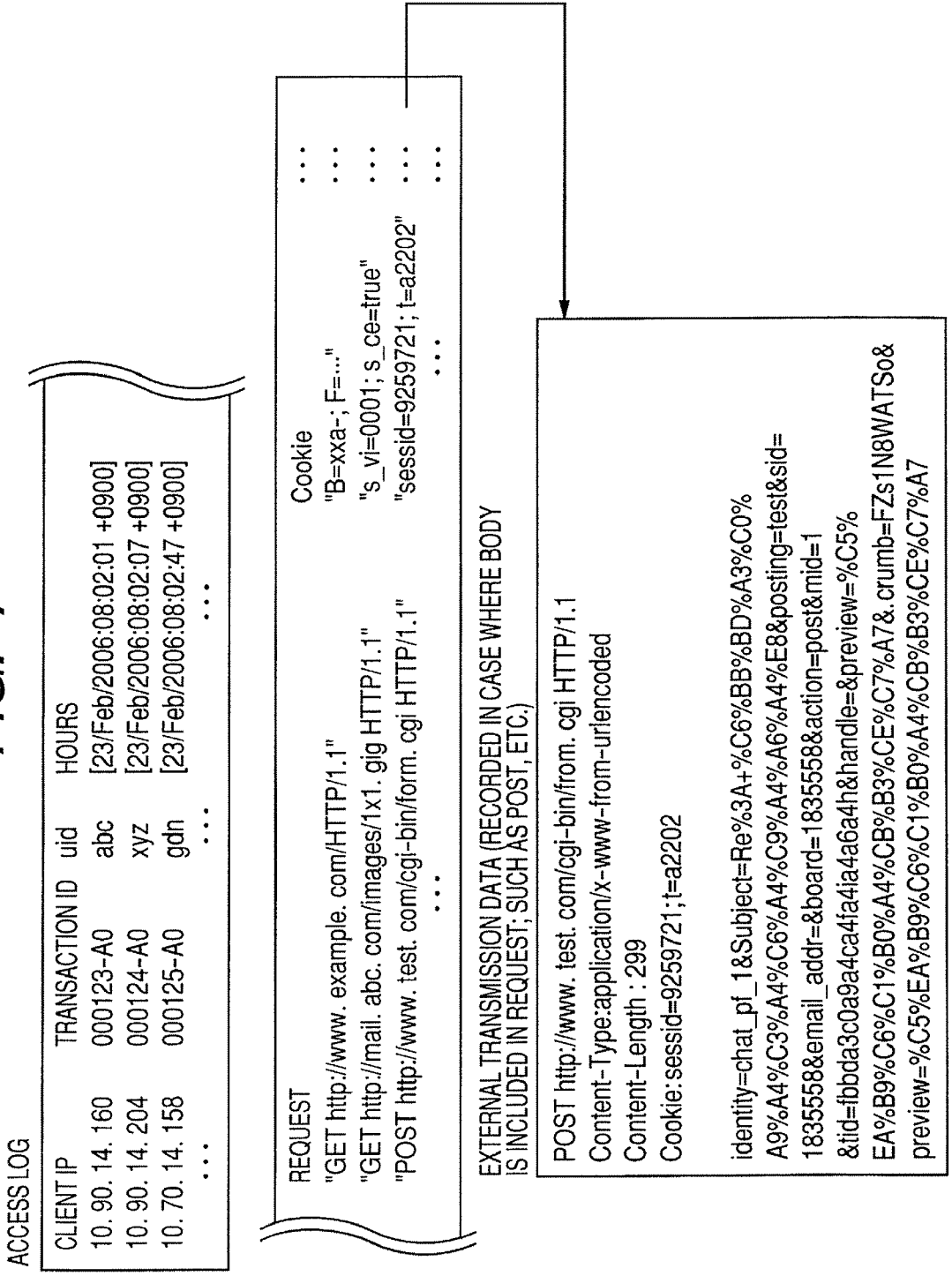
FIG. 7 is a diagram indicating an example of a request record which is recorded in step S304 of FIG. 3.

In step S303, the CPU 201 of the relay server 101 analyzes the received HTTP data. Then, in step S304, a record of requests including an access log according to a predetermined format and external transmission data is created in the HDD 204 (FIG. 7). That is, an IP address, a transaction ID (ID unique to each request), an authentication name (uid), an hour, a request URL (including a query portion), a Cookie header value and the like are recorded as the access log for each of all the requests. Incidentally, after the above process has been executed, the CPU 201 of the relay server 101 is again on standby in step S301.

Further, as for the request having a body portion, the whole of request is recorded as the external transmission data. Incidentally, to make subsequent browsing and management of data file easy, for example, data for each day may be collected as one file.

FIG. 7 is a diagram indicating an example of the request record which is recorded in the step S304 of FIG. 3.

Subsequently, a process of creating a session management table for managing detailed information of each session in electronic mail creation will be described with reference to a flow chart illustrated in FIG. 4. Here, the process of creating the session management table is executed in a case where it is instructed from the administrator terminal to the relay server 101 to execute operations for extracting and displaying electronic mail data from a request record file created as described above.

Figure 4:
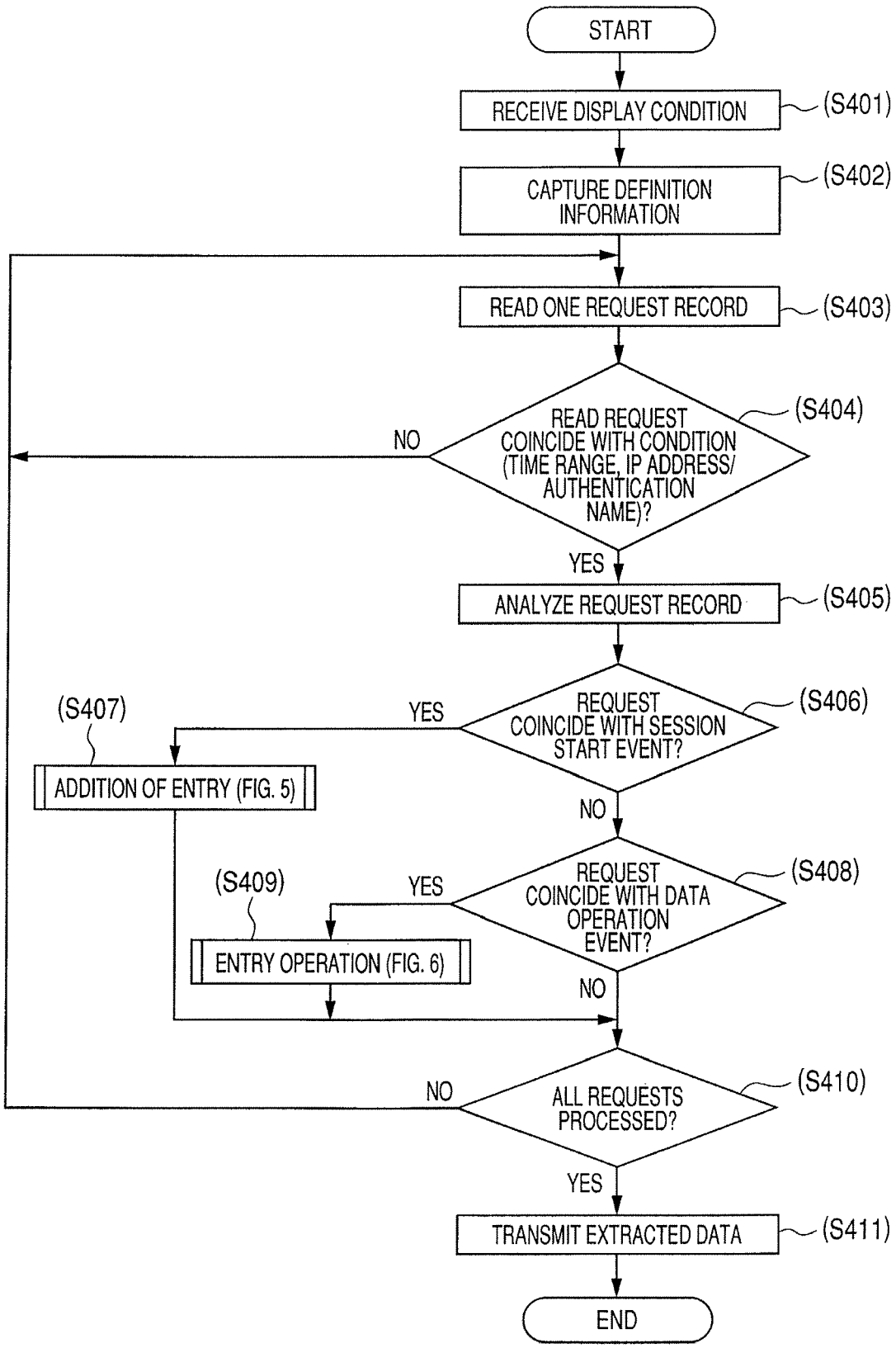
FIG. 4 is a flow chart indicating an example of a procedure of a second control process according to one embodiment of the present invention.

FIG. 4 is a flow chart indicating an example of a procedure of a second control process according to the present invention. Here, it should be noted that that the second control process corresponds to the session management table creation process executed by the relay server 101. Incidentally, the program and the data for causing the CPU 201 to execute the process according to the flow chart of FIG. 4 have been stored in the HDD 204. Consequently, if the program and the data stored in the HDD 204 are loaded to the RAM 202 under the control of the CPU 201, the CPU 201 executes the process by using the program and the data loaded to the RAM 202, and as a result the relay server 101 executes the following process. Here, it should be noted that S401, S402, S403, S404, S405, S406, S407, S408, S409, S410 and S411 in FIG. 4 indicate respective steps.

Initially, in the administrator terminal apparatus 107, the CPU 201 causes the display unit 209 to display, for example, an extraction condition input screen 1900 as illustrated in FIG. 19 so as to accept the conditions that the administrator wishes to extract and display.

FIG. 19 is a diagram indicating an example of the extraction condition input screen through which the extraction conditions are input by the administrator terminal apparatus 107.

On the extraction condition input screen 1900 illustrated in FIG. 19, it is possible to input various extraction condition items such as a period, a time range, IP address/authentication name, a site, receiver/broadcast receiver addresses, a mail subject, an attachment, a size, a start method and a state respectively to sections 1901 to 1910. In any case, if a display button 1911 is pointed by a pointing device, the CPU 201 of the administrator terminal apparatus 107 transmits the values of the respective items input on the extraction condition input screen 1900 to the relay server 101.

Then, if the CPU 201 of the relay server 101 receives the data from the administrator terminal apparatus 107 in step S401, the CPU 201 advances the process to step S402. In step S402, the CPU 201 of the relay server 101 loads a site definition table illustrated in FIG. 8, a session start event definition table illustrated in FIG. 9, and a data operation event definition table illustrated in FIG. 10 from the HDD 204 to the RAM 202, respectively.

FIG. 8 is a diagram indicating an example of the site definition table to be used in the present invention.

As illustrated in FIG. 8, a set of a site name, a client identifier and a session identifier corresponding to each site ID has been registered in the site definition table. For example, the site name "freemail", the client identifier "Cookie parameter 'SESSID' value" and the session identifier "form data 'mailid' value" are correlated, and a set of these values has been registered in regard to the site ID "1".

FIG. 9 is a diagram indicating an example of the session start event definition table to be used in the present invention.

As illustrated in FIG. 9, a set of events such as "new creation", "draft open (to open a drafted and stored mail)", "return (to return to a received mail)", "return to all" and "transfer (to transfer a received mail)", definition information in a case where the events are started, and actions for the respective events has been registered in the session start event definition table.

For example, in regard to the site ID "1", the newly created event corresponds to a case where "request URL coincides with 'http://mail.example.com/Compose' and query parameter does not include 'msgid' value". If such a condition is satisfied, the definitions of respective actions are correlated. More specifically, "new" is set to the start method, the state is set to "start", start hour and user information are set, and an event history is recorded.

FIG. 10 is a diagram indicating an example of the data operation event definition table to be used in the present invention.

As illustrated in FIG. 10, a set of definition information concerning data operations such as file attachment, deletion of attached file, transition to file attachment screen, mail transmission, draft storage and cancellation for each site ID and their respective actions has been registered in the data operation event definition table.

For example, in regard to the site ID "1", the event of file attachment corresponds to a case where "request URL coincides with 'http://mail.example.com/Attach' and value of form data 'action' coincides with 'attach'". If such a condition is satisfied, the definitions of respective actions are correlated with this event. More specifically, the data of form data 'userFile' is added to the attached file, last hour is updated, and an event history is recorded.

Hereinafter, the flow chart of FIG. 4 will be again described.

In step S403, the CPU 201 of the relay server 101 reads one request from the request record file (FIG. 7) stored in step S304.

In step S404, it is determined by the CPU 201 of the relay server 101 whether or not the request read in step S403 coincides with the condition received in step S401 (that is, the condition which is input on the extraction condition input screen 1900 of FIG. 19). If it is determined that the read request coincides with the received condition, that is, if "YES" in step S404, the CPU 201 advances the process to step S405. On the other hand, if it is determined that the read request does not coincide with the received condition, that is, if "NO" in step S404, the CPU 201 returns the process to step S403. Then, in step S405, the CPU 201 of the relay server 101 further decomposes the request read in step S403 into the constituent elements (namely, the respective elements to be referred in the following processes). In other words, for example, the Cookie header value is decomposed into tokens by using semicolons as the delimiters, and each token is decomposed into a pair of "name"–"value" using "=" as the delimiter. Further, if there is the external transmission data, the contents of the request body are analyzed and decomposed into the constituent elements on the basis of the content of a Content-Type header, a Content-Length header or a Transfer-Encoding header.

Subsequently, in step S406, it is determined by the CPU 201 of the relay server 101 whether or not the request analyzed in step S405 coincides with the condition in the session start event table (FIG. 9). If it is determined that the request coincides with the condition in the session start event table, that is, if "YES" in step S406, the CPU 201 advances the process to step S407 to add new entry to the session management table (see later-described FIG. 5 in detail).

On the other hand, if it is determined by the CPU 201 of the relay server 101 in step S406 that the request analyzed in step S405 does not coincide with any condition in the session start event table (FIG. 9), that is, if "NO" in step S406, the CPU 201 advances the process to step S408.

In step S408, it is determined by the CPU 201 of the relay server 101 whether or not the request analyzed in step S405 coincides with the condition in the data operation event table (FIG. 10). If it is determined that the request coincides with the condition in the data operation event table, that is, if "YES" in step S408, the CPU 201 advances the process to step S409 to execute an entry operation on the session management table (see later-described FIG. 6 in detail).

On the other hand, if it is determined by the CPU 201 of the relay server 101 in step S408 that the request analyzed in step S405 does not coincide with any condition in the data operation event table (FIG. 10), that is, if "NO" in step S408, the CPU 201 advances the process to step S410.

In step S410, it is confirmed or determined by the CPU 201 of the relay server 101 whether or not the process for all the requests to be browsed ends. If it is determined that the request which is not yet processed remains, that is, if "NO" in step S410, the CPU 201 returns the process to step S403 to repeat the operation up to the end of the process for all the requests to be browsed.

On the other hand, if it is determined in step S410 that the process for all the requests to be browsed ends, that is, if "YES" in step S410, the CPU 201 advances the process to step S411.

At the last, in step S411, the CPU 201 of the relay server 101 transmits the processed result to the administrator terminal apparatus 107, and the process of the flow chart illustrated in FIG. 4 ends.

Incidentally, the administrator terminal apparatus 107 which received the processed result transmitted from the relay server 101 in step S411 displays the received result on the display unit 209 of the administrator terminal apparatus 107.

In the following, the process for adding new entry to the session management table in step S407 will be described with reference to FIG. 5.

Figure 5:
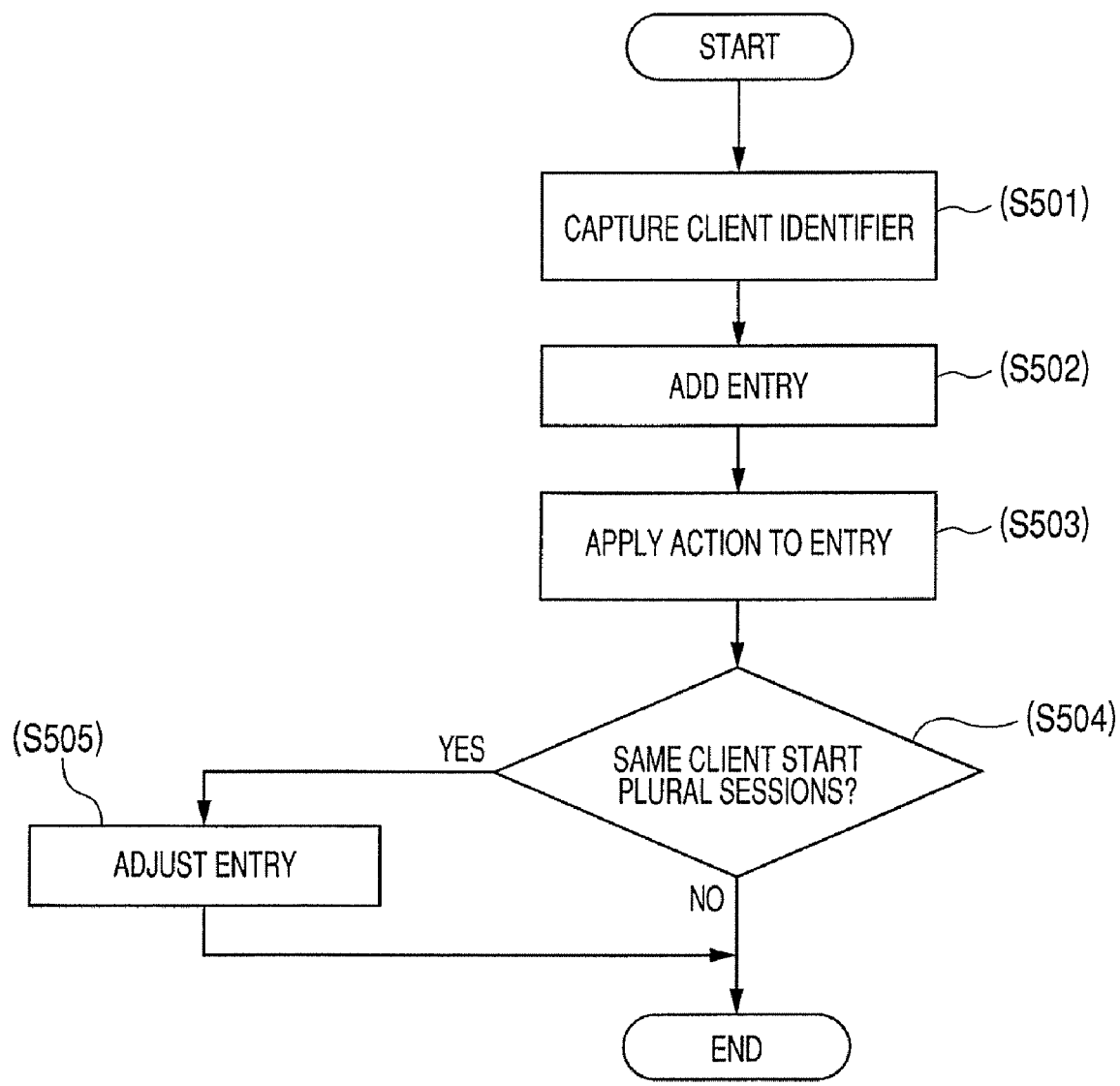
FIG. 5 is a flow chart indicating an example of a procedure of a third control process according to one embodiment of the present invention.

FIG. 5 is a flow chart indicating an example of a procedure of a third control process according to one embodiment of the present invention. Here, it should be noted that that the third control process corresponds to the entry addition process in step S407 of FIG. 4. Incidentally, the program and the data for causing the CPU 201 to execute the process according to the flow chart of FIG. 5 have been stored in the HDD 204. Consequently, if the program and the data stored in the HDD 204 are loaded to the RAM 202 under the control of the CPU 201, the CPU 201 executes the process by using the program and the data loaded to the RAM 202, and as a result the relay server 101 executes the following process. Here, it should be noted that S501, S502, S503, S504 and S505 in FIG. 5 indicate respective steps.

In step S501, the CPU 201 of the relay server 101 captures the client identifier (e.g., pid=ajk2jkkj) from among the elements decomposed in step S405 of FIG. 4. Then, in step S502, the CPU 201 adds, as a new entry, the captured client identifier to the session management table held in the HDD 204 of the relay server 101 (FIG. 12).

Subsequently, in step S503, the CPU 201 of the relay server 101 executes the action which has been registered in the session start event definition table (FIG. 9) and corresponds to the site information and the event coincided in step S406 of FIG. 4. Namely, for example, "transfer" is set to the start method, and "start" is set to the state. Then, from the request received in step S406 of FIG. 4, "start hour 2006/09/26 12:43:24" is set, "192.168.0.1" is set to the IP address of the user information, "abc" is set to the authentication name of the user information, and the set of the coincided event and transaction ID "transfer (00075A-A0)" is set to the event history. The above-created data set is recorded in the record added in step S502. The result of the above process is illustrated in FIG. 12.

Here, it is assumed that the plural browsers having the same client identifier are opened and thus plural Web-based e-mails are simultaneously created. In such as case, the plural entries which have the same client identifier and to which session identifiers are not yet registered are created on the session management table. Such a state is illustrated in FIG. 13.

In this case, it is impossible to determine uniquely an entry in a later-described step S605 of FIG. 6. For this reason, if the plural sessions are started by the same client as described above (namely, if the plural entries are created), that is, if "YES" in step S504, the CPU 201 of the relay server 101 advances the process to step S505 to change the values of the entries. More specifically, in step S505, all the entries in each of the start method, the start hour and the event history are logically summed (OR), and the summed result is illustrated in FIG. 14.

After then, the entry addition process ends.

Incidentally, each of FIGS. 11, 12, 13 and 14 is a diagram indicating an example of the session management table to be used in an embodiment of the present invention.

In the following, the entry operation in step S409 will be described with reference to FIG. 6.

Figure 6:
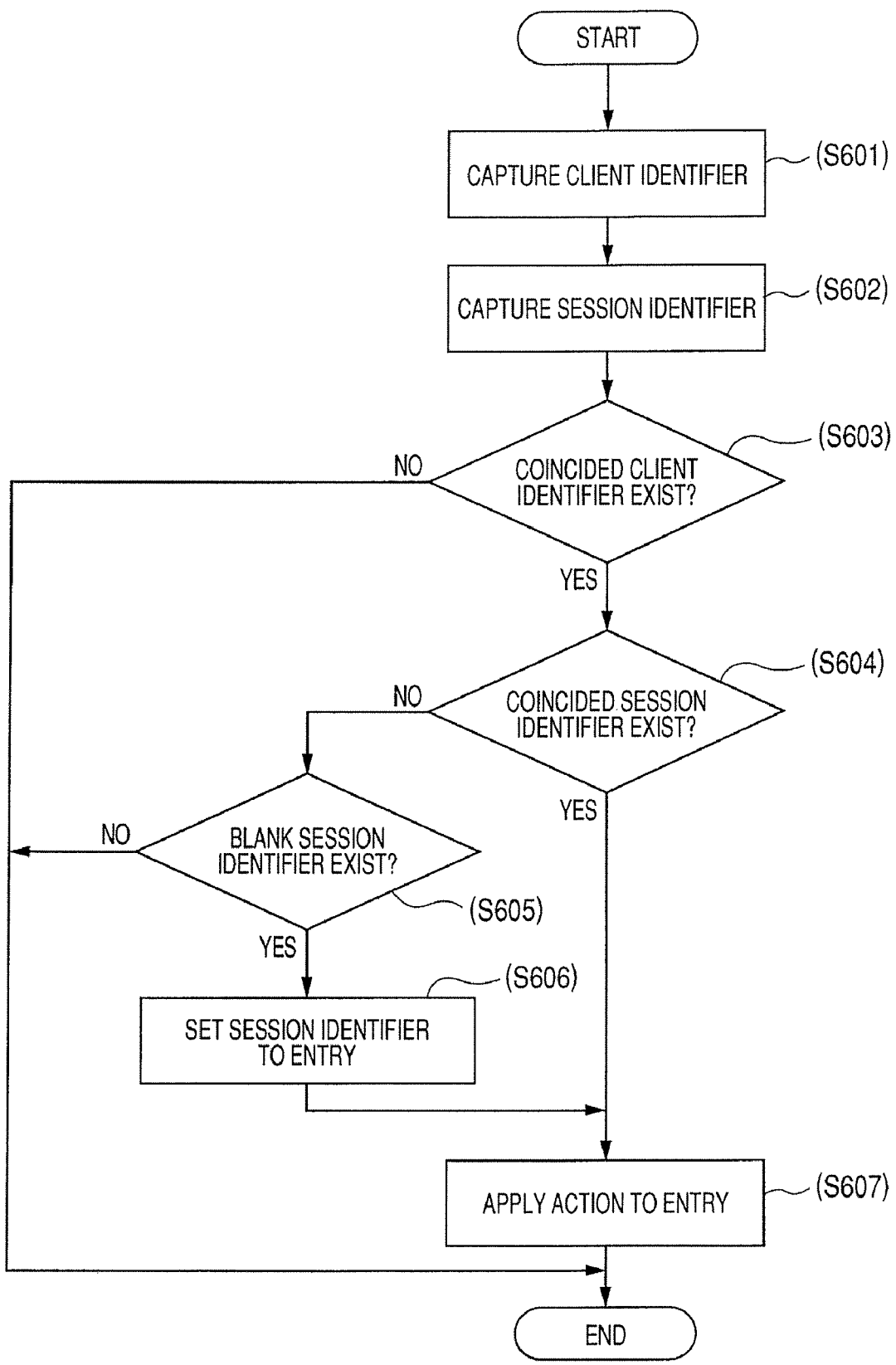
FIG. 6 is a flow chart indicating an example of a procedure of a fourth control process according to one embodiment of the present invention.

FIG. 6 is a flow chart indicating an example of a procedure of a fourth control process according to an embodiment of the present invention. Here, it should be noted that that the fourth control process corresponds to the entry operation in step S409 of FIG. 4. Incidentally, the program and the data for causing the CPU 201 to execute the process according to the flow chart of FIG. 6 have been stored in the HDD 204. Consequently, if the program and the data stored in the HDD 204 are loaded to the RAM 202 under the control of the CPU 201, the CPU 201 executes the process by using the program and the data loaded to the RAM 202, and as a result the relay server 101 executes the following process. Here, it should be noted that S601, S602, S603, S604, S605, S606 and S607 in FIG. 6 indicate respective steps.

In steps S601 and S602, the CPU 201 of the relay server 101 captures the client identifier (e.g., sid=a17.sub.—001) and the session identifier (e.g., a=fd319189) from among the elements decomposed in step S405 of FIG. 4.

Then, in step S603, it is determined by the CPU 201 of the relay server 101 whether or not the captured client identifier coincides with the client identifier included in the session management table (e.g., FIG. 14). If it is determined that the captured client identifier coincides with the client identifier included in the session management table, that is, if "YES" in step S603, the CPU 201 advances the process to step S604.

On the other hand, if it is determined in step S603 that the captured client identifier does not coincide with any client identifier included in the session management table, that is, if "NO" in step S603, the CPU 201 of the relay server 101 ends the process.

Then, in step S604, it is determined by the CPU 201 of the relay server 101 whether or not, from among the Web-based e-mails of which the session identifiers coincide with those included in the session management table, the captured session identifier coincides with the session identifier included in the session management table. If it is determined that the captured session identifier coincides with the session identifier included in the session management table, that is, if "YES" in step S604, the CPU 201 advances the process to step S607 (because it is determined as the same Web-based e-mail) to apply the action to the entry. In other words, the CPU 201 of the relay server 101 executes the action which has been registered in the data operation event table (FIG. 10) and corresponds to the site information and the event coincided in step S408 of FIG. 4.

On the other hand, if it is determined in step S604 that the captured session identifier does not coincide with the session identifier included in the session management table although the captured client identifier coincides with the client identifier included in the session management table, that is, if "NO" in step S604, the CPU 201 of the relay server 101 advances the process to step S605.

In step S605, it is determined by the CPU 201 of the relay server 101 whether or not, from among the Web-based e-mails of which the client identifiers coincide with those included in the session management table in step S603, the Web-based e-mail of which the session identifier is blank exists. If it is determined that the Web-based e-mail of which the session identifier is blank exists, that is, if "YES" in step S605, the CPU 201 advances the process to step S606 to set "a=fd319189" to the blank session identifier. Then, the CPU 201 advances the process to step S607.

On the other hand, if it is determined in step S605 that, from among the Web-based e-mails of which the client identifiers coincide with those included in the session management table, the Web-based e-mail of which the session identifier is blank does not exist, that is, if "NO" in step S605, the CPU 201 of the relay server 101 directly ends the process.

In step S607, the CPU 201 of the relay server 101 executes the action which has been registered in the data operation event definition table (FIG. 10) and corresponds to the site information and the event coincided in step S408 of FIG. 4. Namely, the value of the form data "To" is set to the destination, the value of the form data "Cc" is set to the CC, the value of the form data "Subj" is set to the subject, the value of the form data "Body" is set to the body text, "transmitted" is set to the state, and the last hour is updated. Further, the event history is recorded, and the session management table is updated. The result of the above process is illustrated in FIG. 11.

In the above description, for example, based on the request records each of which has been recorded with respect to one day, the session management table is created from the request records within a certain period (designated on the extraction condition input screen 1900 of FIG. 19). However, the session management table may be created from the HTTP data flowing in real time. Moreover, newly transmitted data may be added in real time to the past request records by properly combining such two kinds of methods as above.

Moreover, the session management tables may be integrated for record with respect to each unit period or plural independent unit periods, from the request records of the plural periods.

In other words, one session management table for one month may be created from the request records which are divisionally recoded every day for one month.

In the following, the process to be executed in a case where an administrator browses electronic mails transmitted by Web-based e-mails based on the session management table created as above will be described with reference to FIGS. 15, 16, 17 and 18.

Each of FIGS. 15 to 18 is a diagram indicating an example of a Web-based e-mail browsing screen to be displayed on the administrator terminal apparatus 107.

If a browsing process is requested from the administrator terminal apparatus 107, the CPU 201 of the relay server 101 executes the processes of the above-described flow charts illustrated in FIGS. 4 to 6 to create the session management table, and to return the data indicating the start method and the state, as well as a transmission date and hour, an IP address, an authentication name, a subject matter and the like, to the administrator terminal apparatus 107 (S411 in FIG. 4). The CPU 201 of the administrator terminal apparatus 107, which received the returned data, displays the list as illustrated in FIG. 15.

Incidentally, if a request of listing the electronic mails of which the state section 1910 is "draft storage" is input by the administrator through the extraction condition input screen 1900 of FIG. 19, only the data of which the state is "draft storage" are extracted and returned from the session management table (S411 in FIG. 4). The CPU 201 of the administrator terminal apparatus 107, which received the returned data, displays the list as illustrated in FIG. 16.

Further, in the list illustrated in FIG. 16, if an underlined portion (associated mail search) 1602 in an "operation" section 1601 is pointed by the pointing device 208, the CPU 201 of the relay server 101 returns, to the administrator terminal apparatus 107, the data which concerns a Web-based e-mail created from the draft by the same user on the same site after the date and time when the relevant Web-based e-mail was drafted and stored (S411 in FIG. 4). The CPU 201 of the administrator terminal apparatus 107, which received the returned data, displays the list as illustrated in FIG. 17.

Incidentally, in the respective lists illustrated in FIGS. 15 to 17, for example, if an underlined portion (body text display) 1502 in an "operation" section 1501 is pointed by the pointing device 208, the CPU 201 of the administrator terminal apparatus 107 displays the body text of the corresponding mail on the display unit 209.

In this way, the administrator can confirm the content of the data drafted and stored in the HTTP server 105 on the way to create the electronic mail and the content of the Web-based e-mail finally transmitted.

On the contrary, in a case where the administrator confirms, in the state of displaying the list of electronic mails, the drafted and stored data in the HTTP server 105 in regard to a certain specific mail of which the start method is "draft" on the way to create the relevant mail, if the underlined portion (associated mail search) in the "operation" section of the relevant mail is pointed by the pointing device 208, the CPU 201 of the relay server 101 returns, to the administrator terminal apparatus 107, the data which concerns the Web-based e-mail drafted and stored by the same user on the same site before the date and time when the draft was opened (S411 in FIG. 4). The CPU 201 of the administrator terminal apparatus 107, which receives the returned data, displays the list as illustrated in FIG. 16.

Incidentally, in a case where the above-described list is displayed by using the event history recorded on the session management table, it is possible to detect and display the data by using this event as a key.

Further, it is also possible to search and display (FIG. 18) the detail of the event from the session, by using the event history.

As just described, the present embodiment brings about a significant effect that the administrator can execute higher accurate mail browsing, by extracting not only the content of the Web-based e-mail but also the mail creation start method and the transmission state.

Incidentally, the constitutions and the contents of the above-describe various data are not limited to those described with regard to the present embodiment. That is, it is needless to say that the necessary data can have various constitutions and contents according to intended purposes and objects.

As above, one embodiment of the present invention has been described. However, the present invention can adopt an embodiment as a system, an apparatus, a method, a program, a recording medium or the like. More specifically, the present invention may be applied to a system consisting of plural devices, or to an apparatus comprising a single device.

Hereinafter, the architecture of data processing programs readable by the formation processing apparatus (that is, the relay server 101) according to the present invention will be explained with reference to a memory map illustrated in FIG. 20.

FIG. 20 is the diagram for explaining the memory map of the recording (storage) medium which stores the various data processing programs readable by the information processing apparatus (that is, the relay server 101) according to the present invention.

Incidentally, although it is not illustrated specifically, also information (e.g., version information, creator information, etc.) for administrating the program groups stored in the recording medium may occasionally be stored in the recording medium, and information (e.g., icon information for discriminatively displaying a program, etc.) depending on an OS or the like on the program reading side may occasionally be stored in the recording medium.

Moreover, the data depending on the various programs are administrated on the directory of the recording medium. A program to install various programs into a computer, a program to uncompress installed programs and data when the installed programs and data have been compressed, and the like are occasionally stored in the recording medium.

Moreover, the functions illustrated in FIGS. 3, 4, 5 and 6 may be executed by a host computer based on externally installed programs. In that case, the present invention is applicable even in a case where an information group including programs is supplied from a recording medium (such as a CD-ROM, a flash memory, an FD or the like) or an external recording medium through a network to an output apparatus.

Incidentally, it is needless to say that the object of the present invention can be achieved in a case where the recording medium storing the program codes of software to realize the functions of the above embodiment is supplied to a system or an apparatus and then a computer (or CPU or MPU) in the system or the apparatus reads and executes the program codes stored in the recording medium.

In that case, the program codes themselves read from the recording medium realize the new functions of the present invention, whereby the recording medium storing these program codes constitutes the present invention.

As the recording medium for supplying the program codes, for example, a flexible disk, a hard disk, an optical disk, a magnetooptical disk, a CR-ROM, a CD-R, a CD-RW, a DVD-ROM, a magnetic tape, a nonvolatile memory card, a ROM, an EEPROM, a silicon disk or the like can be used.

Moreover, it is needless to say that the present invention includes not only a case where the functions of the above embodiment are realized by executing the program codes read by a computer, but also a case where an OS (operating system) or the like functioning on a computer executes a part or all of the actual processes according to the instructions of the program codes, whereby the functions of the above embodiment are achieved by that process.

Moreover, it is needless to say that the functions of the above embodiment can be achieved in a case where the program read from the recording medium is once written in a memory provided in a function expansion board inserted in a computer or a function expansion unit connected to a computer, and then a CPU or the like provided in the function expansion board or the function expansion unit executes a part or all of the actual processes according to the instructions of the program.

Moreover, the present invention may be applied to a system consisting of plural devices, or to an apparatus comprising a single device. In addition, it is needless to say that the present invention is also applicable to a case where the functions of the above embodiment are realized by supplying a program to a system or an apparatus. In this case, if the recording medium storing the program of software to realize the present invention is ready by the system or the apparatus, the system or the apparatus can enjoy the effect of the present invention.

Moreover, if the program of software for realizing the present invention is downloaded and read from a server, a database or the like on a network to the system or the apparatus according to a communication program, the system or the apparatus can enjoy the effect of the present invention.

Incidentally, it should be noted that a constitution acquired by combining the above embodiment and its modification is completely included in the present invention.

While the present invention has been described with reference to what is presently considered to be the preferred embodiment, it is to be understood that the present invention is not limited to the disclosed embodiment. In such a meaning, the above preferred embodiment is merely an exemplification of the present invention.

It should be noted that the technical concept of the present invention should be defined by the appended claims, but should not be limitedly interpreted by only the description of the specification.

Moreover, it should be noted that any adjustment and modification not departing from the scope of the technical concept described in the appended claims constitute the technical concept of the present invention.

This application claims the benefit of Japanese Patent Application No. 2006-356528, filed Dec. 28, 2006, which is hereby incorporated by reference herein in its entirety.

What is claimed is:

1. An information processing apparatus comprising:
a communication unit adapted to communicate with a Web-based e-mail server which provides a service for transmitting and receiving an electronic mail by using an HTTP (HyperText Transfer Protocol) and a client apparatus that uses the service, and to relay data between the Web-based e-mail server and the client apparatus;
a definition information storage unit adapted to store first definition information for defining a session start event and an action for the session start event and second definition information for defining a data operation event and an action for the data operation event, in the service provided by the Web-based e-mail server;
a request recording unit adapted to record request information concerning a Web-based e-mail to be transmitted from the client apparatus to the Web-based e-mail server; and
a session management information creation unit adapted to read the request information recorded by the request recording unit, and to create session management information based on the first definition information and the second definition information,
wherein, in a case where the request information recorded by the request recording unit is the session start event, the session management information creation unit sets a start of the Web-based e-mail to the session management information according to the action defined to the session start event based on the first definition information, and
in a case where the request information recorded by the request recording unit is the data operation event, the session management information creation unit sets an input content of the Web-based e-mail to the session management information according to the action defined to the data operation event based on the second definition information.

2. An information processing apparatus according to claim 1, wherein,
in a case where the request information recorded by the request recording unit is the data operation event indicating draft storage for the Web-based e-mail, the session management information creation unit sets a draft storage state and its update date and hour to the session management information, and
in a case where the request information recorded by the request recording unit is the session start event indicating the open of a draft for the Web-based e-mail, the session management information creation unit sets a start state from the draft and its start date and hour to the session management information.

3. An information processing apparatus according to claim 2, further comprising a first specifying unit adapted to specify, from a specific Web-based e-mail in which the state of the session management information is the draft storage state, the Web-based e-mail of which the start date and hour is after the update date and hour of the draft storage of the specific Web-based e-mail and which was started from the draft having the same user information as that of the specific Web-based e-mail.

4. An information processing apparatus according to claim 2, further comprising a second specifying unit adapted to specify, from a specific Web-based e-mail in which a start method of the session management information is the draft, the drafted and stored Web-based e-mail of which the update date and hour is before the start date and hour of the specific Web-based e-mail and which has the same user information as that of the specific Web-based e-mail.

5. An information processing apparatus according to claim 1, wherein, in a case of creating the session management information, if the request information and a client identifier coincide with each other and the session management information in which a session identifier is not yet set exists, the session identifier of the request information can be set as an identifier of the session management information.

6. An information processing apparatus according to claim 5, wherein, if there are plural session management information each of which has the same client identifier and none of which has the session identifier, summations respectively acquired by combining start methods, start hours and event histories of the plural session management information can be set respectively as start methods, start hours and event histories of the plural session management information.

7. An information processing apparatus according to claim 1, further comprising a display information creation unit adapted to create, from the session management information, display information for correlating the request information concerning the Web-based e-mail and the state thereof and to display them.

8. An information processing apparatus according to claim 1, further comprising a display information creation unit adapted to create display information for displaying the data communicated with the Web-based e-mail server and the state thereof for one Web-based e-mail from the session management information.

9. An information processing apparatus according to claim 1, wherein the request recording unit records, as log information, the request information in a storage unit of the information processing apparatus.

10. An information processing apparatus according to claim 1, wherein the request information is information which is transmitted and received in real time by using the HTTP.

11. A control method for an information processing apparatus, comprising:
a communication step of communicating with a Web-based e-mail server which provides a service for transmitting and receiving an electronic mail by using an HTTP (HyperText Transport Protocol) and a client apparatus that uses the service, and relaying data between the Web-based e-mail server and the client apparatus;
a definition information storage step of storing first definition information for defining a session start event and an action for the session start event and second definition information for defining a data operation event and an action for the data operation event, in the service provided by the Web-based e-mail server;
a request recording step of recording request information concerning a Web-based e-mail to be transmitted from the client apparatus to the Web-based e-mail server; and
a session management information creation step of reading the request information recorded in the request recording step, and of creating session management information based on the first definition information and the second definition information,
wherein, in a case where the request information recorded in the request recording step is the session start event, the session management information creation step sets a start of the Web-based e-mail to the session management information according to the action defined to the session start event based on the first definition information, and in a case where the request information recorded in the request recording step is the data operation event, the session management information creation step sets an operation content of the Web-based e-mail to the session management information according to the action defined to the data operation event based on the second definition information.

12. A non-transitory computer-readable recording medium which stores therein a program for causing a computer to function as an information processing apparatus, wherein the information processing apparatus comprises:

a communication unit adapted to communicate with a Web-based e-mail server which provides a service for transmitting and receiving an electronic mail by using an HTTP (HyperText Transfer Protocol) and a client apparatus that uses the service, and to relay data between the Web-based e-mail server and the client apparatus;

a definition information storage unit adapted to store first definition information for defining a session start event and an action for the session start event and second definition information for defining a data operation event and an action for the data operation event, in the service provided by the Web-based e-mail server;

a request recording unit adapted to record request information concerning a Web-based e-mail to be transmitted from the client apparatus to the Web-based e-mail server; and a session management information creation unit adapted to read the request information recorded by the request recording unit, and to create session management information based on the first definition information and the second definition information, wherein, in a case where the request information recorded by the request recording unit is the session start event, the session management information creation unit sets a start of the Web-based e-mail to the session management information according to the action defined to the session start event based on the first definition information, and in a case where the request information recorded by the request recording unit is the data operation event, the session management information creation unit sets an input content of the Web-based e-mail to the session management information according to the action defined to the data operation event based on the second definition information.

13. A non-transitory computer-readable recording medium which stores therein a program for causing a computer to execute a control method for an information processing apparatus, wherein the control method is a control method for an information processing apparatus, and wherein the control method comprises:

a communication step of communicating with a Web-based e-mail server which provides a service for transmitting and receiving an electronic mail by using an HTTP (HyperText Transport Protocol) and a client apparatus that uses the service, and relaying data between the Web-based e-mail server and the client apparatus;

a definition information storage step of storing first definition information for defining a session start event and an action for the session start event and second definition information for defining a data operation event and an action for the data operation event, in the service provided by the Web-based e-mail server;

a request recording step of recording request information concerning a Web-based e-mail to be transmitted from the client apparatus to the Web-based e-mail server; and a session management information creation step of reading the request information recorded in the request recording step, and of creating session management information based on the first definition information and the second definition information, wherein, in a case where the request information recorded in the request recording step is the session start event, the session management information creation step sets a start of the Web-based e-mail to the session management information according to the action defined to the session start event based on the first definition information, and in a case where the request information recorded in the request recording step is the data operation event, the session management information creation step sets an operation content of the Web-based e-mail to the session management.

* * * * *